US012609487B2

(12) United States Patent
Chen et al.

(10) Patent No.: US 12,609,487 B2
(45) Date of Patent: Apr. 21, 2026

(54) CONNECTOR ASSEMBLY WITH RELIABLE LOCKING STRUCTURE

(71) Applicant: Luxshare Automotive Connection System (Shanghai) Co., Ltd, Shanghai (CN)

(72) Inventors: Xiaoming Chen, Shanghai (CN); Xingran Tang, Shanghai (CN); Rongxin Shen, Shanghai (CN); Jiaqiang Luo, Shanghai (CN)

(73) Assignee: LUXSHARE AUTOMOTIVE CONNECTION SYSTEM (SHANGHAI) CO., LTD, Shanghai (CN)

( * ) Notice: Subject to any disclaimer, the term of this patent is extended or adjusted under 35 U.S.C. 154(b) by 266 days.

(21) Appl. No.: 18/367,332

(22) Filed: Sep. 12, 2023

(65) Prior Publication Data

US 2025/0070510 A1 Feb. 27, 2025

(30) Foreign Application Priority Data

Aug. 21, 2023 (CN) ........................ 202311056859.X

(51) Int. Cl.
*H01R 13/639* (2006.01)
*H01R 13/627* (2006.01)
(Continued)

(52) U.S. Cl.
CPC ....... *H01R 13/639* (2013.01); *H01R 13/6273* (2013.01); *H01R 13/53* (2013.01); *H01R 2107/00* (2013.01)

(58) Field of Classification Search
CPC .......................... H01R 13/639; H01R 13/6273
(Continued)

(56) References Cited

U.S. PATENT DOCUMENTS

| | | | | |
|---|---|---|---|---|
| 6,261,133 B1 * | 7/2001 | Kubo | ................ | H01R 13/4362 439/752 |
| 6,702,628 B2 * | 3/2004 | Tanaka | .............. | H01R 13/4362 439/701 |

(Continued)

FOREIGN PATENT DOCUMENTS

| | | |
|---|---|---|
| CN | 208461058 U | 2/2019 |
| CN | 208797232 U | 4/2019 |

(Continued)

*Primary Examiner* — Hae Moon Hyeon
(74) *Attorney, Agent, or Firm* — Birch, Stewart, Kolasch & Birch, LLP

(57) ABSTRACT

A connector assembly includes a connector and a locking structure. The connector includes an insulating body. The insulating body includes at least one mating end portion. The mating end portion defines a first mating space for receiving a conductive terminal. The locking structure is held to the mating end portion. The locking structure has a pre-locking position and a locking position relative to the mating end portion. The locking structure includes a body portion and a resisting portion. The body portion is configured to receive a high voltage interlock terminal. The resisting portion is configured such that when the locking structure is at the pre-tightened position, the resisting portion is located outside the first mating space; when the locking structure is at the locking position, at least part of the resisting portion protrudes into the first mating space.

20 Claims, 16 Drawing Sheets

(51) Int. Cl.
*H01R 13/53* (2006.01)
*H01R 107/00* (2006.01)

(58) Field of Classification Search
USPC .................................................. 439/352, 752
See application file for complete search history.

(56) References Cited

U.S. PATENT DOCUMENTS

| | | | | |
|---|---|---|---|---|
| 7,988,502 | B2 * | 8/2011 | Nagano .............. | H01R 13/4362 439/752 |
| 2003/0068930 | A1 * | 4/2003 | Endo .................. | H01R 13/4362 439/752 |
| 2017/0025778 | A1 | 1/2017 | Ang et al. | |
| 2025/0219321 | A1 * | 7/2025 | Li ........................ | H01R 13/514 |

FOREIGN PATENT DOCUMENTS

| | | | | | |
|---|---|---|---|---|---|
| CN | 112217024 | A | | 1/2021 | |
| CN | 216120991 | U | | 3/2022 | |
| CN | 217281300 | U | | 8/2022 | |
| CN | 115362603 | A | | 11/2022 | |
| CN | 116914468 | A | * | 10/2023 | ........... H01R 13/707 |
| CN | 220672914 | U | | 3/2024 | |
| CN | 120237470 | A | * | 7/2025 | ......... H01R 13/6275 |
| KR | 10-2021-0090360 | A | | 7/2021 | |
| WO | WO 2016/170052 | A1 | | 10/2016 | |

* cited by examiner

C-C

D-D

CONNECTOR ASSEMBLY WITH RELIABLE LOCKING STRUCTURE

CROSS-REFERENCE TO RELATED APPLICATION

This patent application claims priority of a Chinese Patent Application No. 202311056859. X, filed on Aug. 21, 2023 and titled "CONNECTOR ASSEMBLY", the entire content of which is incorporated herein by reference.

TECHNICAL FIELD

The present disclosure relates to a connector assembly, which belongs to the technical field of connectors.

BACKGROUND

In the related art, a high voltage connector usually includes a separate insulating structure for fixing, positioning and insulating a high voltage interlock terminal. If conductive terminals in the high-voltage connector become loose, it will affect the electrical performance and even cause safety problems. Therefore, a locking structure is often used in the related art to fix the position of the conductive terminals. A separate part is added for each technical problem, which leads to more parts in the connector, and the corresponding mold and assembly costs are high.

SUMMARY

An object of the present disclosure is to provide a connector assembly which includes a connector and a locking structure. The locking structure can not only insulate and position the high-voltage interlock terminal, but also prevent conductive terminals in the connector from retreating.

In order to achieve the above object, the present disclosure adopts the following technical solution: a connector assembly, including: a connector including an insulating body, the insulating body including at least one mating end portion, the mating end portion defining a first mating space for receiving a conductive terminal; and a locking structure fixed to the mating end portion, the locking structure including a pre-locking position and a locking position which are relative to the mating end portion; the locking structure including a body portion and a resisting portion; the body portion being configured to receive a high voltage interlock terminal; wherein the resisting portion is configured such that: when the locking structure is located at the pre-locking position, the resisting portion is located outside the first mating space; when the locking structure is in the locking position, at least part of the resisting portion protrudes into the first mating space.

In order to achieve the above object, the present disclosure adopts the following technical solution: a connector assembly, including: a connector including an insulating body and a plurality of conductive terminals, the insulating body including an insulating body portion, a plurality of mating end portions extending from the insulating body portion, and an accommodating space formed by the plurality of mating end portions; each mating end portion defining a first mating space for receiving a corresponding conductive terminal; and a locking structure including a body portion, a plurality of holding arm portions and a resisting portion; the body portion being received in the accommodating space and configured to receive a high voltage interlock terminal; each holding arm portion being configured to be fixed to a corresponding mating end portion; the locking structure including a pre-locking position and a locking position which are relative to the connector; wherein the resisting portion is configured such that; when the locking structure is located at the pre-locking position, the resisting portion is located outside a corresponding first mating space; when the locking structure is in the locking position, at least part of the resisting portion protrudes into the corresponding first mating space.

Compared with the prior art, the connector assembly disclosed in the present disclosure includes the connector and the locking structure. The locking structure can not only insulate and position the high-voltage interlock terminal, but also realize the function of preventing the conductive terminal in the connector from retreating. This reduces the overall parts of the connector assembly, and the corresponding mold and assembly costs are reduced.

DETAILED DESCRIPTION

Figure 1:
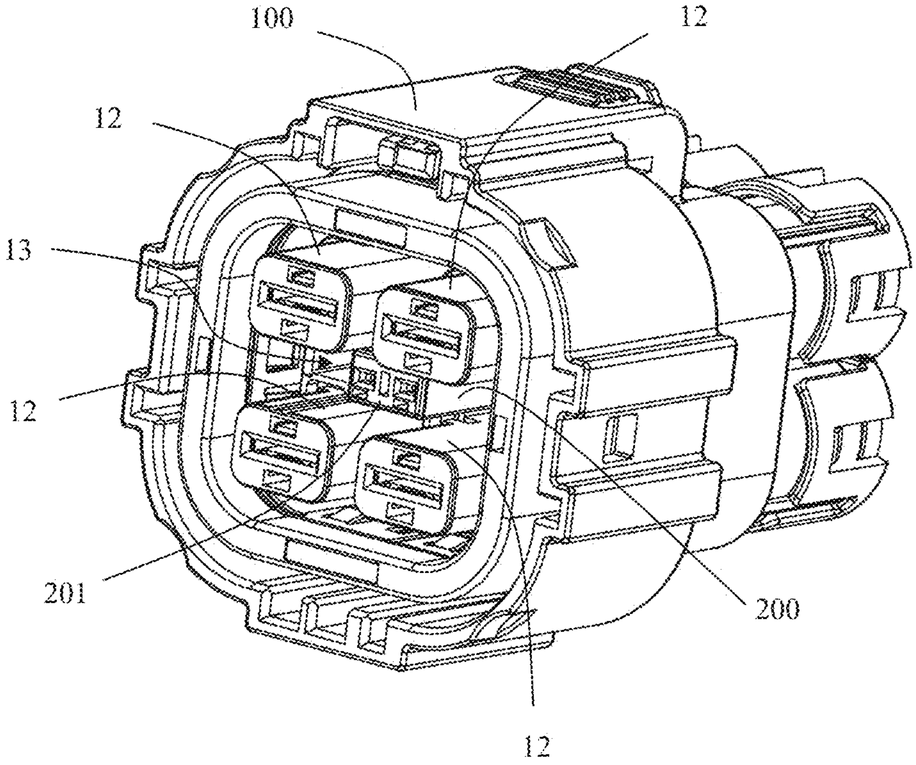
FIG. 1 is a schematic perspective view of a connector assembly in accordance with an embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms “first”, “second” and similar words used in the specification and claims of this application do not represent any order, quantity or importance, but are only used to distinguish different components. Similarly, “an” or “a” and other similar words do not mean a quantity limit, but mean that there is at least one; “multiple” or “a plurality of” means two or more than two. Unless otherwise noted, “front”, “rear”, “lower” and/or “upper” and similar words are for ease of description only and are not limited to one location or one spatial orientation. Similar words such as “include” or “comprise” mean that elements or objects appear before “include” or “comprise” cover elements or objects listed after “include” or “comprise” and their equivalents, and do not exclude other elements or objects. The term “a plurality of” mentioned in the present disclosure includes two or more.

Hereinafter, some embodiments of the present disclosure will be described in detail with reference to the accompanying drawings. In the case of no conflict, the following embodiments and features in the embodiments can be combined with each other.

Direction A1-A1 in the drawings is a direction in which a connector assembly is mated with a mating connector.

The present disclosure discloses a connector assembly. Referring to FIG. 1, the connector assembly includes a connector 100 and a locking structure 200.

Figure 2:
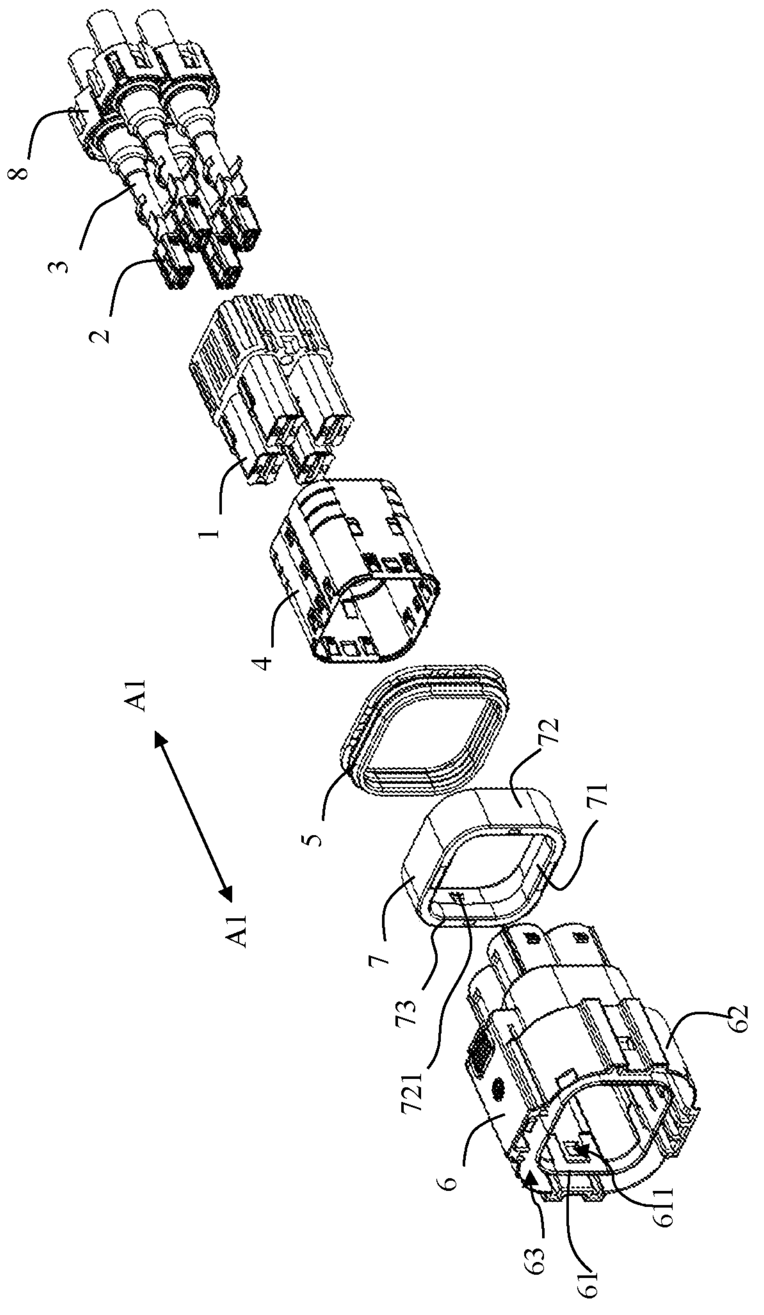
FIG. 2 is a partial exploded schematic view of FIG. 1.
Figure 3:
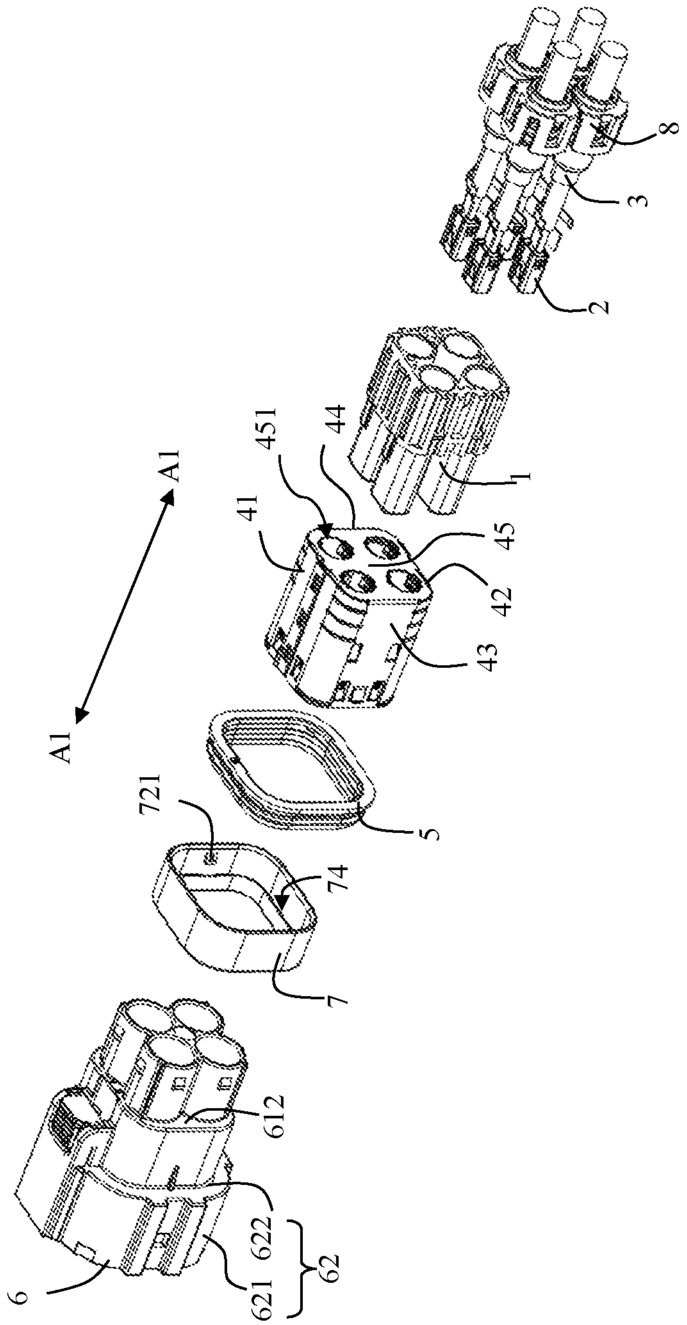
FIG. 3 is a schematic view of FIG. 2 from another angle.

Referring to FIG. 2 and FIG. 3, the connector 100 includes an insulating body 1, a plurality of conductive terminals 2 received in the insulating body 1, a cable assembly 3 with one end connected to the conductive terminals 2, a shielding shell 4 at least partially surrounding the insulating body 1, a protective housing 6 at least partially enclosing the shielding shell 4, a first sealing ring 5 located in the protective housing 6, a mating end shell 7 fixed to a mating end of the protective housing 6, and a cable end shell 8 fixed to a cable end of the protective housing 6.

Figure 5:
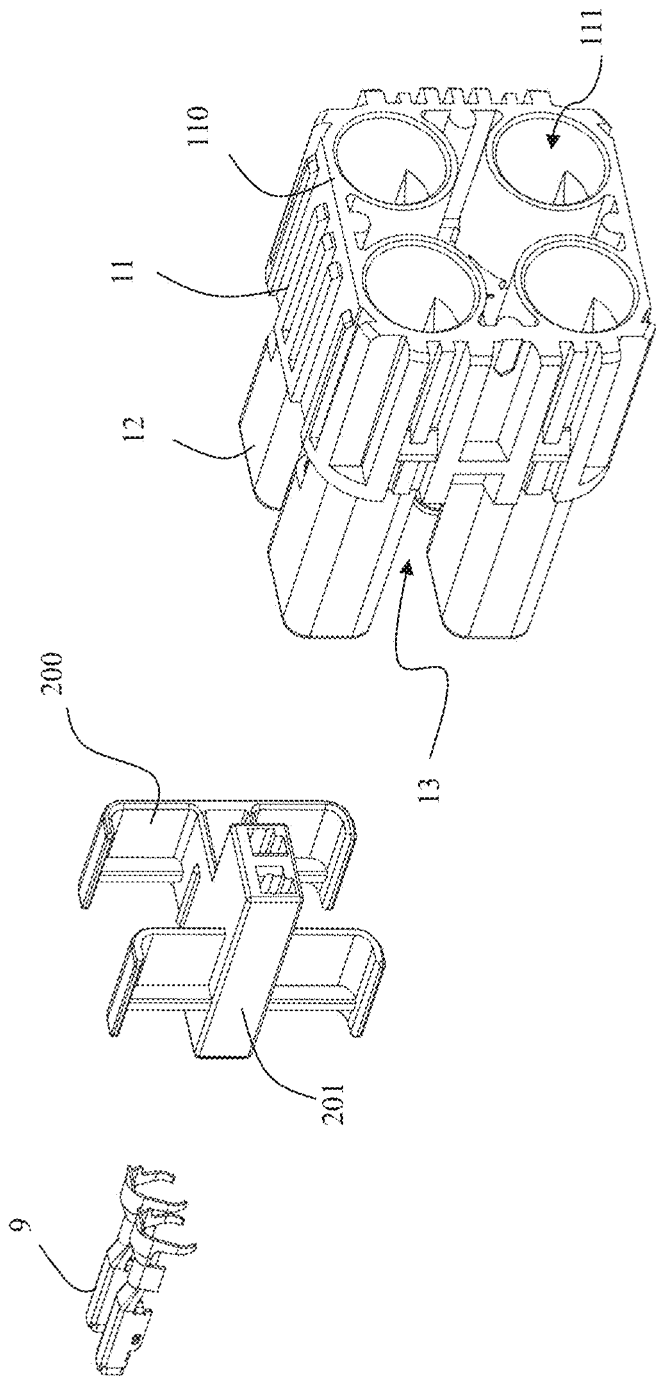
FIG. 5 is a schematic exploded view of high-voltage interlock terminals, a locking structure and an insulating body.
Figure 6:
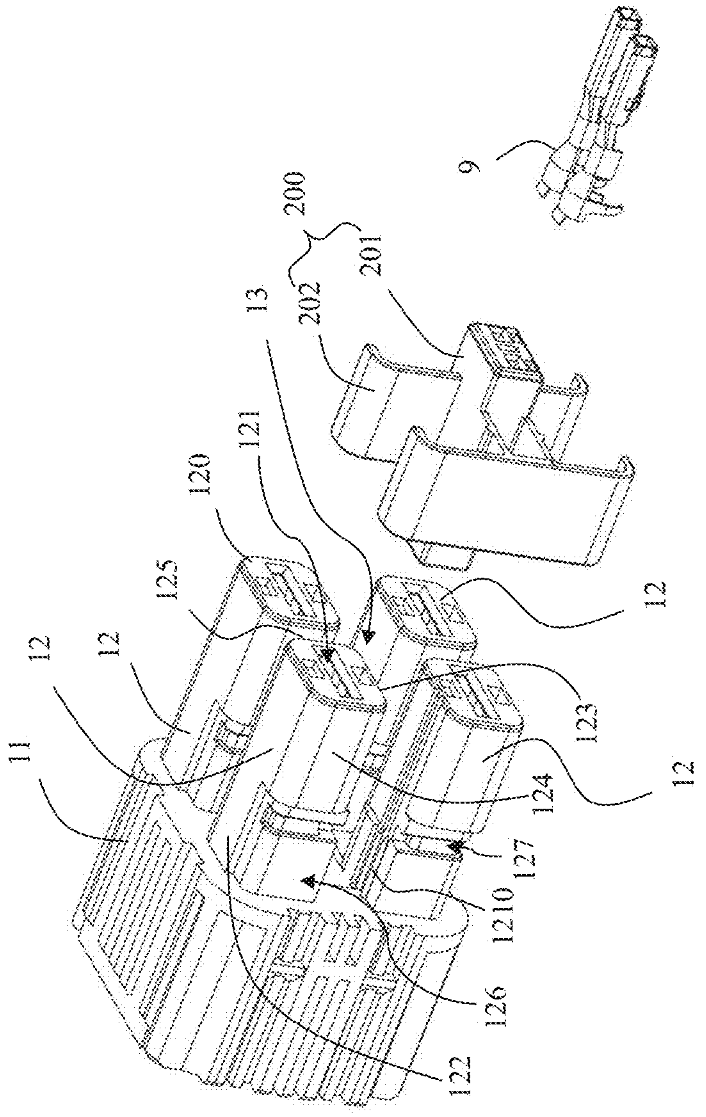
FIG. 6 is a schematic view of FIG. 5 from another angle.

Referring to FIG. 5 and FIG. 6, the insulating body 1 includes an insulating body portion 11 and at least one mating end portion 12 extending outwardly from the insulating body portion 11. In the illustrated embodiment, the insulating body 1 includes four mating end portions 12. The four mating end portions 12 extend in parallel and outwardly from the insulating body portion 11.

The mating end portion 12 includes a first mating end surface 120 and a first mating space 121 extending through the first mating end surface 120 along a mating direction A1-A1. The conductive terminals 2 are received in the first mating space 121.

The insulating body portion 11 includes a cable end surface 110. The cable end surface 110 is opposite to the first mating end surface 120. The insulating body portion 11 includes a second mating space 111. The second mating space 111 extends through the cable end surface 110 along the mating direction A1-A1. In the illustrated embodiment, the insulating body portion 11 has four second mating spaces 111. Each of the first mating spaces 121 communicates with the second mating space 111.

The mating end portion 12 includes a first wall 122, a second wall 123 opposite to the first wall 122, a third wall 124 connecting one end of the first wall 122 and one end of the second wall 123, and a fourth wall 125 connecting the other end of the first wall 122 and the other end of the second wall 123.

The first wall 122, the second wall 123, the third wall 124 and the fourth wall 125 surround the first mating space 121.

The mating end portion 12 further includes a first locking groove 126. The first locking groove 126 is recessed from the first wall 122 and the third wall 124 toward the first mating space 121. The mating end portion 12 further includes a second locking groove 127 (see FIG. 6). The second locking groove 127 is recessed from a groove bottom of the first locking groove 126 toward the first mating space 121 and communicates with the first mating space 121.

Figure 4:
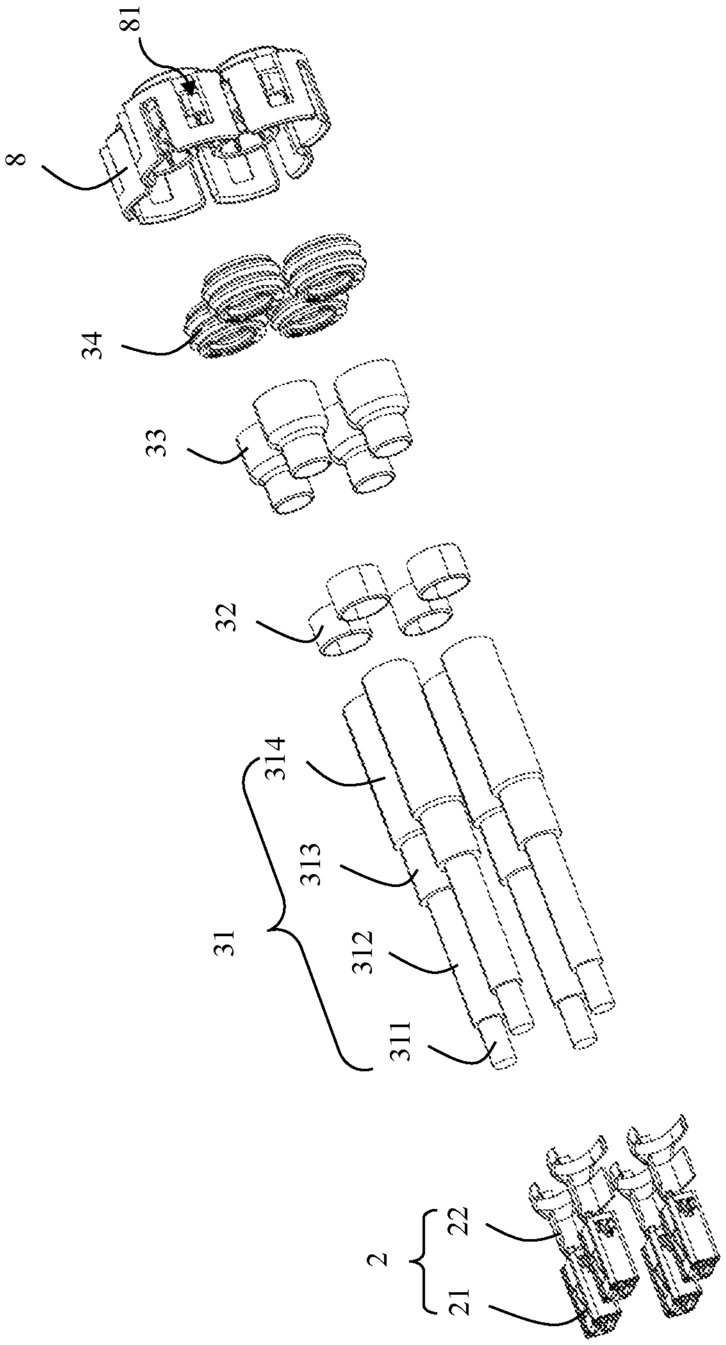
FIG. 4 is an exploded schematic view of components such as a cable assembly in FIG. 2.

Referring to FIG. 4, each conductive terminal 2 includes a first mating portion 21 and a first tail portion 22 connected to the first mating portion 21. The first mating portion 21 is received in the first mating space 121 for mating with the mating connector. The first tail portion 22 is connected to the cable 31 of the cable assembly 3.

The cable assembly 3 includes a plurality of cables 31, a first fastening ring 32, a second fastening ring 33 and a second sealing ring 34.

Each cable 31 includes a core 311, an insulating layer 312 at least partially wrapped on the core 311, a shielding layer 313 at least partially wrapped on the insulating layer 312, and an insulating skin 314 at least partially wrapped on the shielding layer 313.

The core 311 is riveted to the first tail portion 22 for connection. The first fastening ring 32 is fastened around the shielding layer 313. The second fastening ring 33 is sleeved on an outside of the first fastening ring 32. The shielding layer 313 is folded back and fastened between the first fastening ring 32 and the second fastening ring 33. One end of the second fastening ring 33 abuts against or engages with the shielding shell 4.

The second sealing ring 34 is sleeved between the cable 31 and the cable end shell 8.

The cable end shell 8 includes a first positioning groove 81. The cable end shell 8 is engaged with the cable end of the protective housing 6 through the first positioning groove 81.

In the illustrated embodiment, referring to FIG. 3, the shielding shell 4 includes a first shell wall 41, a second shell wall 42 opposite to the first shell wall 41, a third shell wall 43 connecting one end of the first shell wall 41 and one end of the second shell wall 42, a fourth shell wall 44 connecting the other end of the first shell wall 41 and the other end of the second shell wall 42, and a fifth shell wall 45 perpendicular to and connected to the first shell wall 41, the second shell wall 42, the third shell wall 43 and the fourth shell wall 44.

The fifth shell wall 45 includes at least one through hole portion 451. A through hole of the through hole portion 451 extends through the fifth shell wall 45 along the mating direction A1-A1. In the illustrated embodiment, the fifth shell wall 45 includes four through hole portions 451. Each through hole portion 451 corresponds to one second mating space 111.

Referring to FIG. 2 and FIG. 3, the protective housing 6 includes an inner housing 61 and an outer housing 62 which surrounds and is fixed to an outer periphery of the inner housing 61. An annular receiving space 63 is formed between the outer periphery of the inner housing 61 and an inner wall of the outer housing 62. The outer housing 62 includes an annular wall 621 and a first stepped wall 622. The first stepped wall 622 extends outwardly from the outer periphery of the inner housing 61 along a direction perpendicular to the inner housing 61. One end of the annular wall 621 is fixedly connected to the first stepped wall 622.

The inner housing 61 includes a second stepped wall 612. The second stepped wall 612 extends along a direction perpendicular to the mating direction A1-A1. The inner housing 61 includes a second positioning groove 611.

The mating end shell 7 includes an annular inner wall 71, an annular outer wall 72 surrounding an outer periphery of the annular inner wall 71, and a connecting wall 73 connected to the annular inner wall 71 and the annular outer wall 72. The connecting wall 73 is perpendicular to the annular inner wall 71 and the annular outer wall 72.

An annular space 74 is formed between the annular inner wall 71 and the annular outer wall 72.

The annular outer wall 72 includes a first positioning protrusion 721. The first positioning protrusion 721 protrudes inwardly from an inner surface of the annular outer wall 72.

After the mating end shell 7 is installed to the protective housing 6, part of the inner housing 61 protrudes into the annular space 74, and the first positioning protrusion 721 protrudes into the second positioning groove 611 to engage and position.

The first sealing ring 5 is located in the annular receiving space 63. Moreover, along the mating direction A1-A1, one end of the first sealing ring 5 abuts against the annular outer wall 72, and the other end abuts against the first stepped wall 622.

The shielding shell 4 surrounds an outer side of the insulating body 1. Along the mating direction A1-A1, one end of the shielding shell 4 abuts against the inner housing 61, and the other end abuts against the second stepped wall 612.

Figure 13:
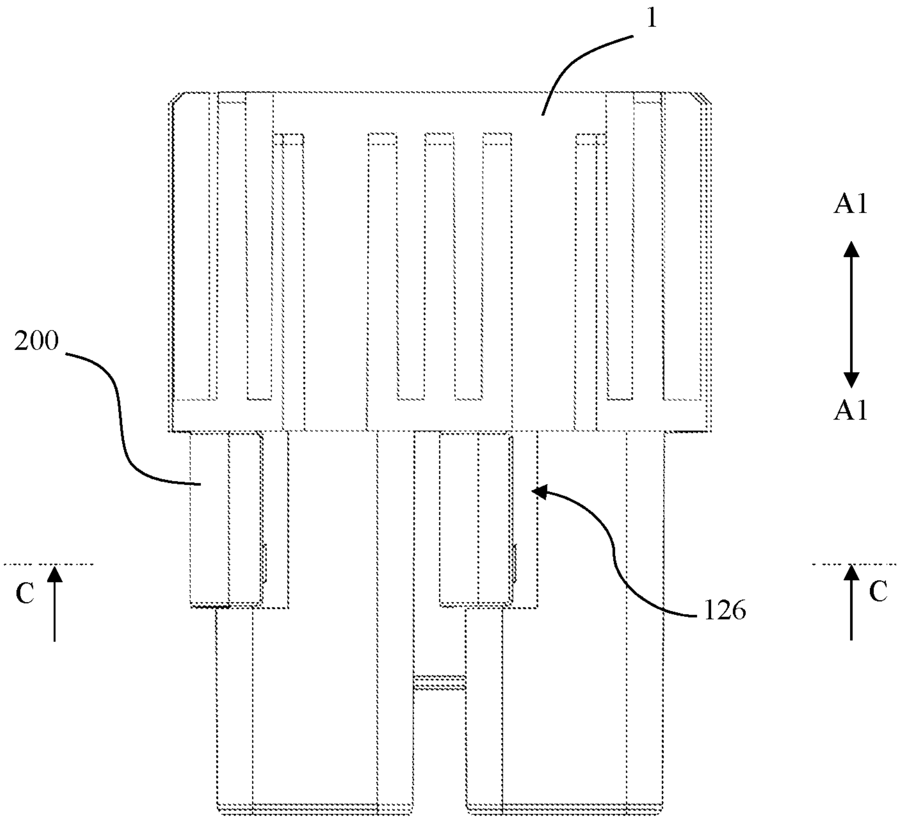
FIG. 13 is a schematic top view of the insulating body and the locking structure.
Figure 14:
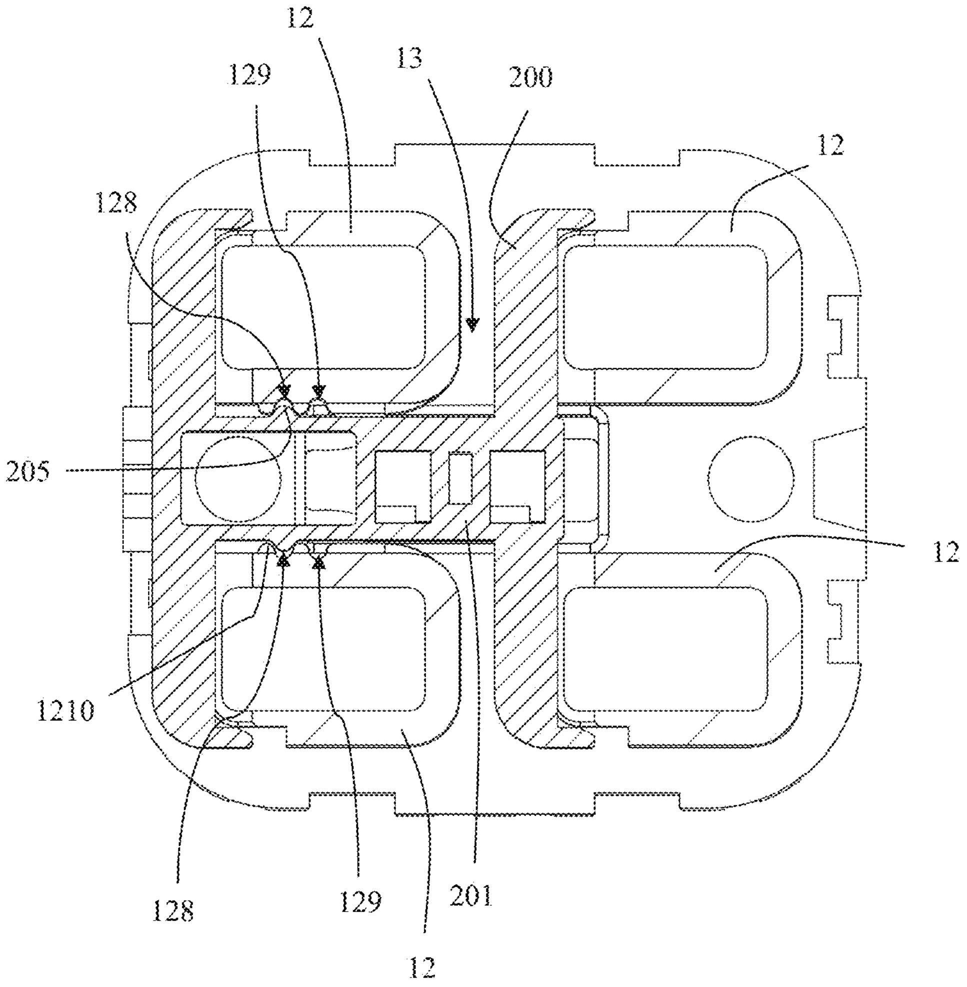
FIG. 14 is a cross-sectional view taken along line C-C in FIG. 13.

Referring to FIG. 13 and FIG. 14, the locking structure 200 is configured to snap fit with the insulating body 1. The locking structure 200 has a pre-locking position and a locking position which are relative to the insulating body 1. In FIG. 13 and FIG. 14, the locking structure 200 is in the pre-locking position.

Referring to FIG. 5 to FIG. 10, the locking structure 200 includes a body portion 201 and a holding arm portion 202.

Figure 9:
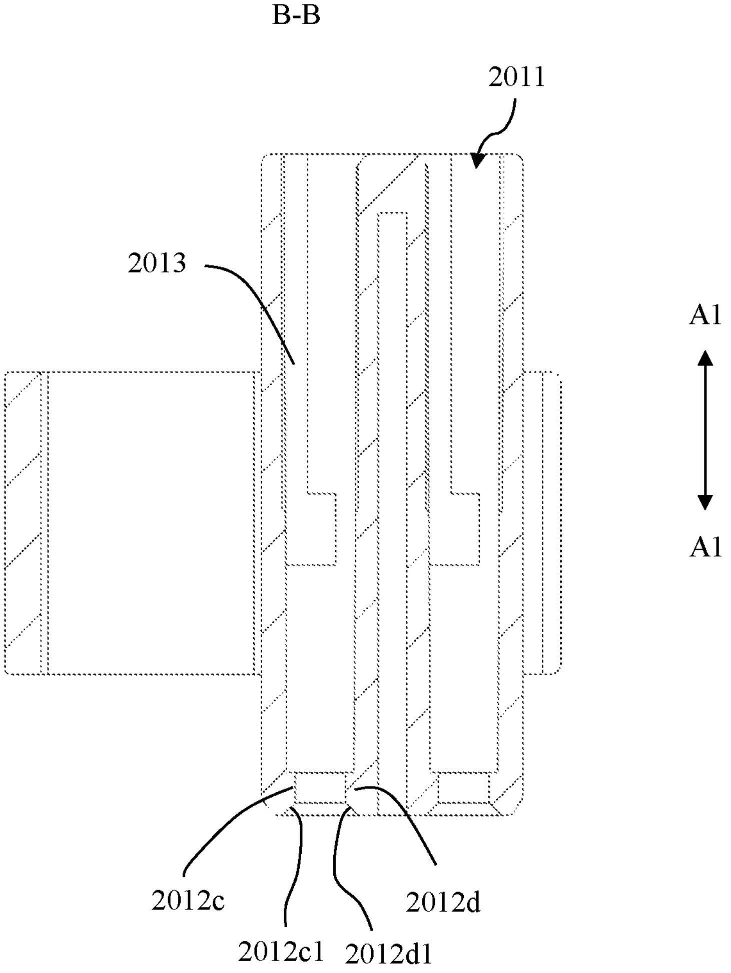
FIG. 9 is a cross-sectional view taken along line B-B in FIG. 7.

The body portion 201 includes a second mating end surface 2010, and at least one receiving and positioning portion 2011 (see FIG. 9). In the illustrated embodiment, the body portion 201 includes two receiving and positioning portions 2011. The two receiving and positioning portions 2011 have the same structure.

The receiving and positioning portion 2011 defines a receiving cavity **2011*f*. The receiving cavity 2011*f* extends through the second mating end surface 2010 along an extending direction of the receiving cavity 2011*f*. The extending direction of the receiving cavity 2011*f*** is in a same direction as the mating direction A1-A1.

Figure 10:
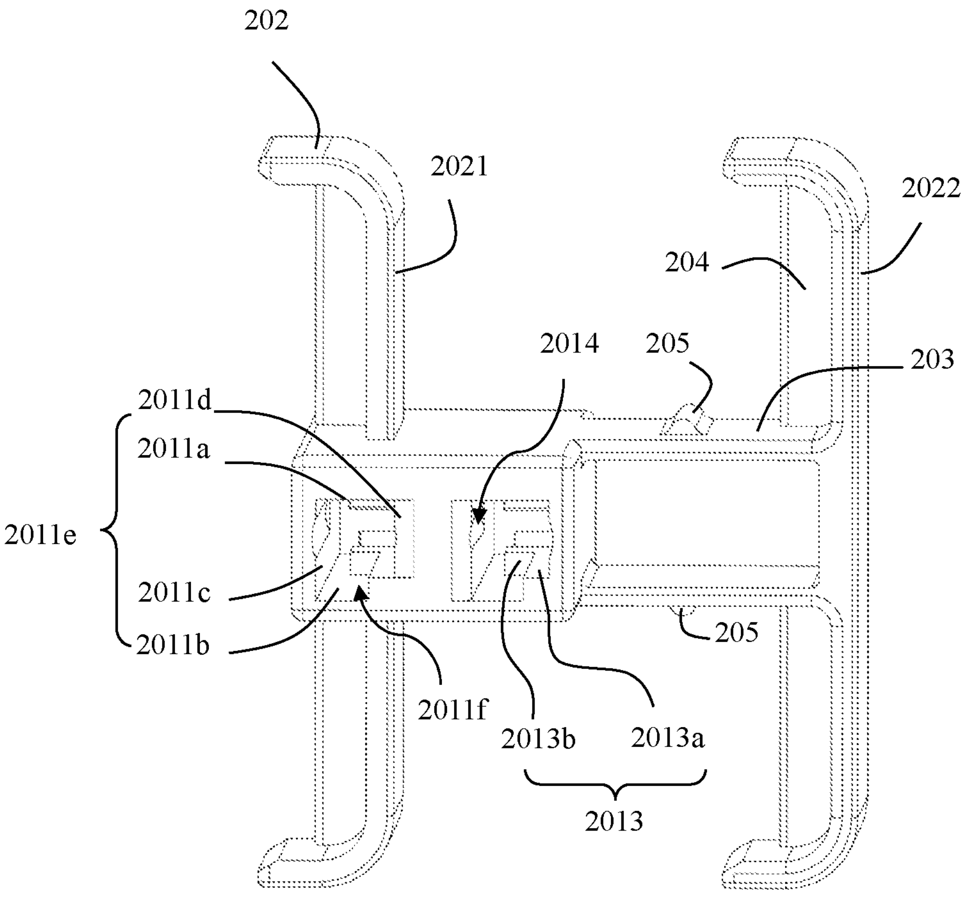
FIG. 10 is an axonometric schematic view of the locking structure.

Referring to FIG. 10, the receiving and positioning portion 2011 further includes a first receiving wall **2011*a*, a second receiving wall 2011*b* opposite to the first receiving wall 2011*a*, a third receiving wall 2011*c* connecting one end of the first receiving wall 2011*a* and one end of the second receiving wall 2011*b*, and a fourth receiving wall 2011*d* connecting the other end of the first receiving wall 2011*a* and the other end of the second receiving wall 2011*b***.

The first receiving wall **2011*a*, the second receiving wall 2011*b*, the third receiving wall 2011*c* and the fourth receiving wall 2011*d* jointly form a receiving wall 2011*e* of the receiving and positioning portion 2011. The receiving wall 2011*e* surrounds the receiving cavity 2011*f***.

The high voltage interlock terminal 9 is received in the receiving cavity **2011*f*. The first receiving wall 2011*a*, the second receiving wall 2011*b*, the third receiving wall 2011*c* and the fourth receiving wall 2011*d* are located in four directions, such as top, bottom, left and right, of the high voltage interlock terminal 9 so as to limit the position of the high voltage interlock terminal 9**.

Figure 15:
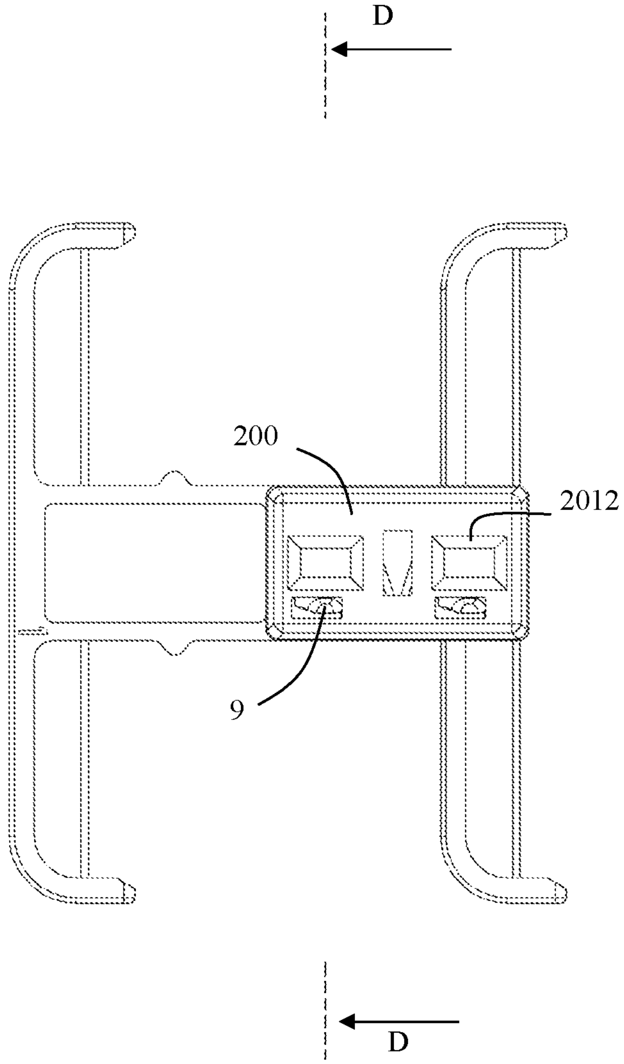
FIG. 15 is a schematic front view of the locking structure and the high voltage interlock terminal.

The body portion 201 further includes an end wall 2012 (see FIG. 15). The end wall 2012 extends from one end of the receiving wall **2011*e* toward the receiving cavity 2011*f***.

Figure 8:
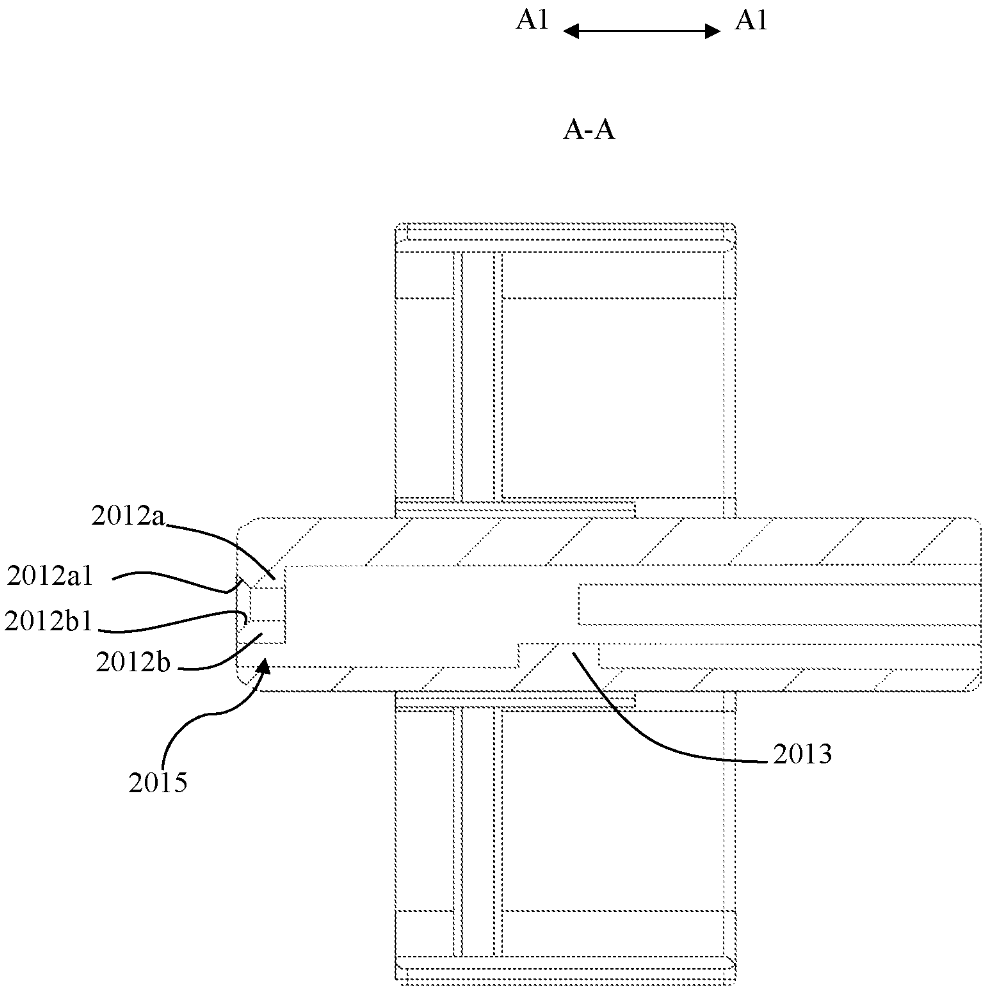
FIG. 8 is a cross-sectional view taken along line A-A in FIG. 7.

In the illustrated embodiment, referring to FIG. 8 and FIG. 9, the end wall 2012 includes a first end wall **2012*a*, a second end wall 2012*b* opposite to the first end wall 2012*a*, a third end wall 2012*c* connecting one end of the first end wall 2012*a* and one end of the second end wall 2012*b*, and a fourth end wall 2012*d* connecting the other end of the first end wall 2012*a* and the other end of the second end wall 2012*b***.

Figure 7:
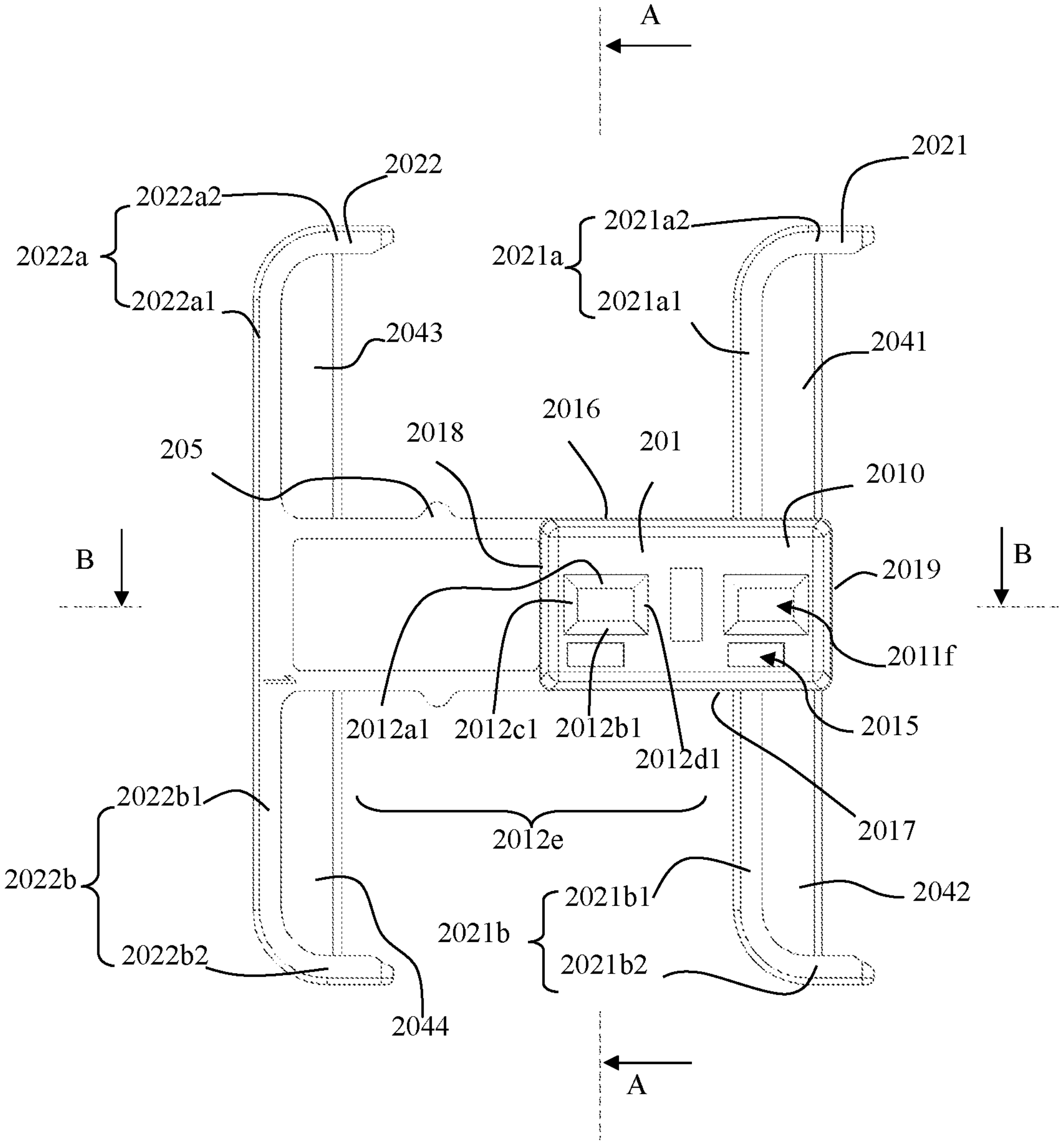
FIG. 7 is a schematic front view of the locking structure.

Referring to FIG. 7, the first end wall **2012*a* includes a first guide inclined surface 2012*a*1. The first guide inclined surface 2012*a*1 extends from the second mating end surface 2010 into the receiving cavity 2011*f* and away from the second mating end surface 2010. The second end wall 2012*b* includes a second guide inclined surface 2012*b*1. The second guide inclined surface 2012*b*1 extends from the second mating end surface 2010 into the receiving cavity 2011*f* and away from the second mating end surface 2010. The third end wall 2012*c* includes a third guide inclined surface 2012*c*1. The third guide inclined surface 2012*c*1 extends from the second mating end surface 2010 into the receiving cavity 2011*f* and away from the second mating end surface 2010. The fourth end wall 2012*d* includes a fourth guide inclined surface 2012*d*1. The fourth guide inclined surface 2012*d*1 extends from the second mating end surface 2010 into the receiving cavity 2011*f* and away from the second mating end surface 2010**.

The first guide inclined surface **2012*a*1, the second guide inclined surface 2012*b*1, the third guide inclined surface 2012*c*1 and the fourth guide inclined surface 2012*d*1 are connected with one another to form a guide inclined surface 2012*e***.

Referring to FIG. 8 to FIG. 10 and FIG. 16, the body portion 201 further includes a second positioning protrusion 2013. The second positioning protrusion 2013 protrudes from the receiving wall **2011*e* toward the receiving cavity 2011*f***.

Along the mating direction A1-A1, the high voltage interlock terminal 9 has at least one surface abutting against the end wall 2012 and at least one surface abutting against the second positioning protrusion 2013. That is, the end wall 2012 and the second positioning protrusion 2013 limit the position of the high voltage interlock terminal 9 in the mating direction A1-A1.

In the illustrated embodiment, the second positioning protrusion 2013 is L-shaped, and includes a first protrusion **2013*a* and a second protrusion 2013*b***.

The first protrusion **2013*a* protrudes from the fourth receiving wall 2011*d* along a wall surface of the second receiving wall 2011*b* toward the receiving cavity 2011*f*. The second protrusion 2013*b* further protrudes from the first protrusion 2013*a* along a wall surface of the second receiving wall 2011*b* toward the receiving cavity 2011*f***.

It should be understood that in other embodiments of the present disclosure, the second positioning protrusion 2013 may also have other shapes, as long as it can realize the positioning of the high voltage interlock terminal 9.

The second positioning protrusion 2013 has a first positioning surface **2013*c***.

Figure 11:
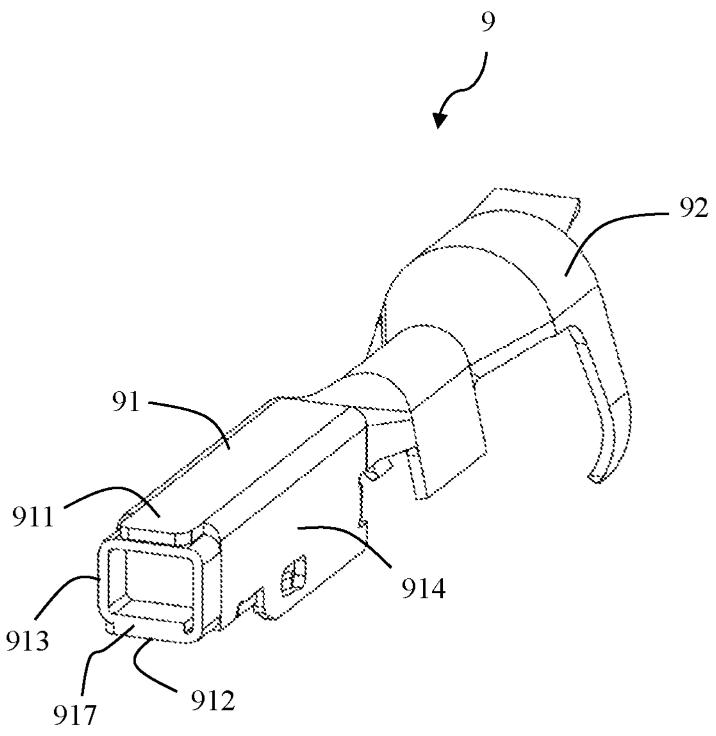
FIG. 11 is a structural schematic view of the high-voltage interlock terminal from one angle.
Figure 12:
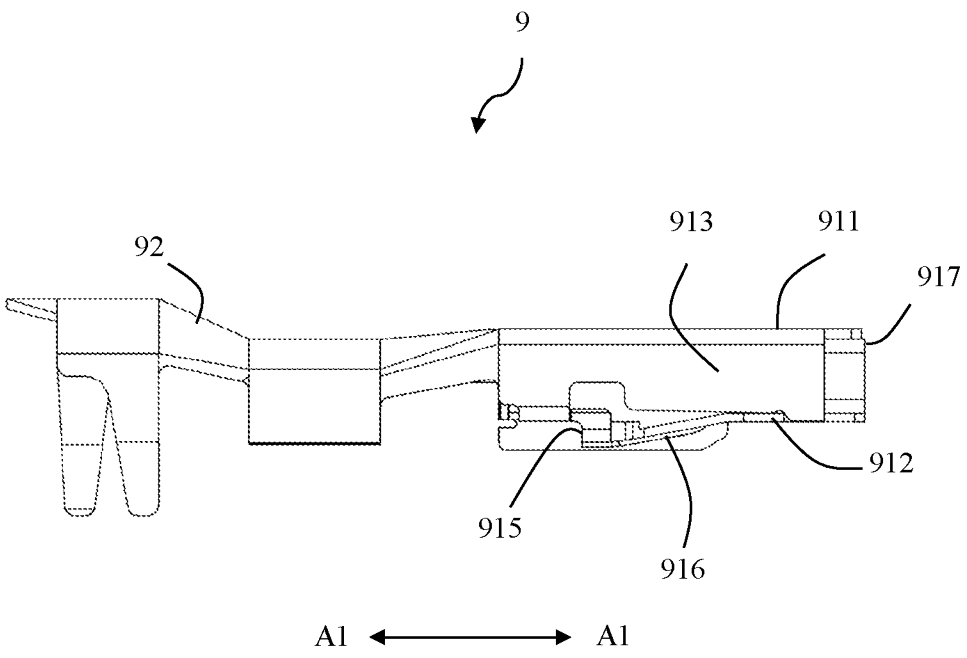
FIG. 12 is a structural schematic view of the high-voltage interlock terminal from another angle.

Referring to FIG. 11 and FIG. 12, the high voltage interlock terminal 9 includes a second mating portion 91 and a second tail portion 92 connected to the second mating portion 91.

The second mating portion 91 includes a first wall 911, a second wall 912 opposite to the first wall 911, a third wall 913 connecting one end of the first wall 911 and one end of the second wall 912, and a fourth wall 914 connecting the other end of the first wall 911 and the other end of the second wall 912.

Figure 16:
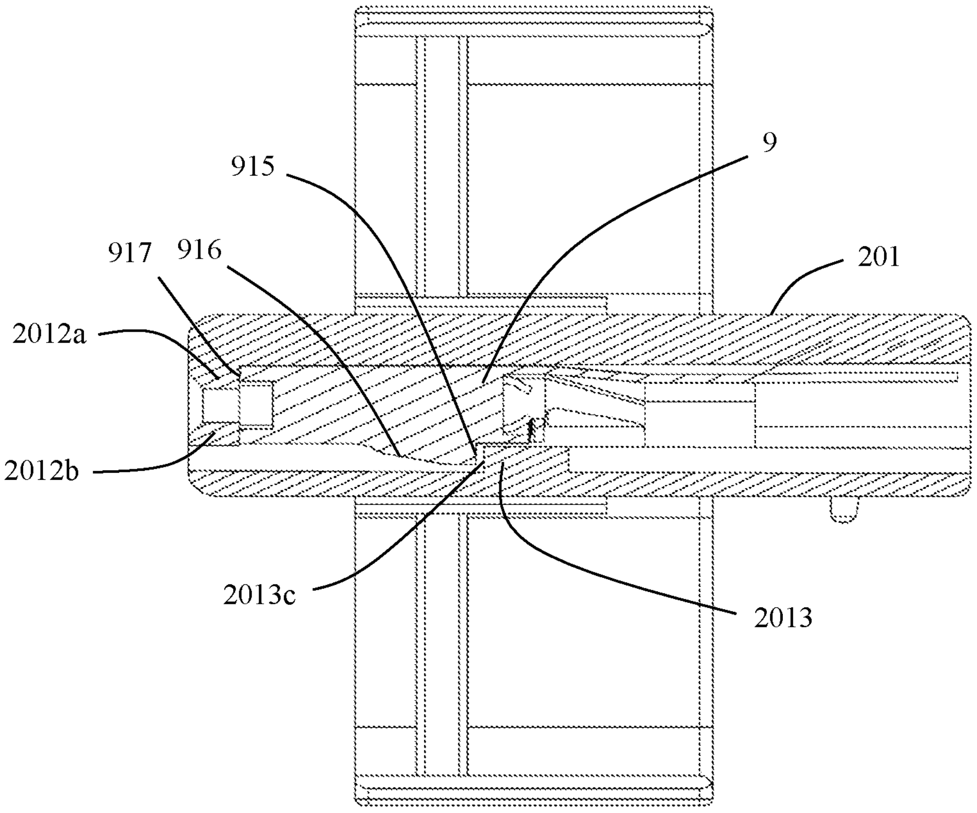
FIG. 16 is a cross-sectional view taken along line D-D in FIG. 15.

Referring to FIG. 12 and FIG. 16, the second mating portion 91 includes a second positioning surface 915. The second positioning surface 915 extends from the second wall 912 along a direction perpendicular to the mating direction A1-A1.

The second mating portion 91 further includes a guide surface 916. The guide surface 916 extends from the second wall 912 toward a direction away from the second wall 912 and away from the mating end of the high voltage interlock terminal 9. The guide surface 916 is connected with the second positioning surface 915 along the mating direction A1-A1.

The second mating portion 91 further includes a mating end surface 917. The mating end surface 917 is opposite to the second positioning surface 915 at intervals in the mating direction A1-A1.

After the high voltage interlock terminal 9 is mounted to the body portion 201, in a circumferential direction of the high voltage interlock terminal 9, the receiving wall 2011*e* forms a position limit for the high voltage interlock terminal 9. For example, the first wall 911, the second wall 912, the third wall 913 and the fourth wall 914 abut against an inner wall surface of the receiving wall 2011*e*; and/or, an outer periphery of the second tail portion 92 abuts against the inner wall surface of the receiving wall 2011*e*.

In the mating direction of the high voltage interlock terminal 9, the mating end surface 917 abuts against the end wall 2012, and the second positioning surface 915 abuts against the first positioning surface 2013*c*.

Referring to FIG. 10, in the illustrated embodiment, the receiving and positioning portion 2011 further includes at least one arc-shaped groove 2014 extending along the mating direction A1-A1. Each receiving and positioning portion 2011 has two arc-shaped grooves 2014. One of the arc-shaped grooves 2014 is recessed from the third receiving wall 2011*c* toward the third receiving wall 2011*c*; and the other of arc-shaped grooves 2014 is recessed from the fourth receiving wall 2011*d* toward the fourth receiving wall 2011*d*. After the high voltage interlock terminal 9 is mounted to the body portion 201, a groove bottom of the arc-shaped groove 2014 abuts against an outer periphery of the second tail portion 92. At that time, the second tail portion 92 has been riveted with a relevant cable, and the second tail portion 92 has a cylindrical shape. The arc-shaped groove 2014 makes the receiving wall 2011*e* more compact while constraining the high voltage interlock terminal 9.

The body portion 201 further includes two disassembly holes 2015. Each disassembly hole 2015 corresponds to one receiving and positioning portion 2011. The disassembly hole 2015 extends through the second mating end surface 2010 along the mating direction A1-A1. Moreover, along the mating direction A1-A1, the disassembly hole 2015 corresponds to the guide surface 916.

When the high voltage interlock terminal 9 needs to be disassembled, a tool can be used to press the guide surface 916 through the disassembly hole 2015 so as to disassemble the high voltage interlock terminal 9.

In the illustrated embodiment, referring to FIG. 7, the body portion 201 includes a first body wall 2016, a second body wall 2017 opposite to the first body wall 2016, a third body wall 2018 connecting one end of the first body wall 2016 and one end of the second body wall 2017, and a fourth body wall 2019 connecting the other end of the first body wall 2016 and the other end of the second body wall 2017.

The first body wall 2016 is parallel to the second body wall 2017. The third body wall 2018 is parallel to the fourth body wall 2019.

The holding arm portion 202 includes a first holding arm portion 2021 and a second holding arm portion 2022.

The first holding arm portion 2021 includes a first arm portion 2021*a* and a second arm portion 2021*b* connected to the body portion 201. Referring to FIG. 14, the first arm portion 2021*a* and the second arm portion 2021*b* are configured to be buckled on the outermost side walls of the two mating end portions 12.

The first arm portion 2021*a* includes a first arm 2021*a*1 and a first locking arm 2021*a*2. The first arm portion 2021*a* extends outwardly from the first body wall 2016 along a direction perpendicular to the first body wall 2016. The first locking arm 2021*a*2 extends from a distal end of the first arm 2021*a*1 along a direction perpendicular to an extension of the first arm 2021*a*1.

The second arm portion 2021*b* includes a second arm 2021*b*1 and a second locking arm 2021*b*2. The second arm portion 2021*b* extends outwardly from the second body wall 2017 along a direction perpendicular to the second body wall 2017. The second locking arm 2021*b*2 extends from a distal end of the second arm 2021*b*1 along a direction perpendicular to an extension of the second arm 2021*b*1.

The first locking arm 2021*a*2 is disposed opposite to the second locking arm 2021*b*2.

Similarly, the second holding arm portion 2022 includes a third arm portion 2022*a* and a fourth arm portion 2022*b* connected to the body portion 201 through an auxiliary connecting plate 203. The third arm portion 2022*a* and the fourth arm portion 2022*b* are configured to be buckled on the outermost side walls of the two mating end portions 12.

The third arm portion 2022*a* includes a third arm 2022*a*1 and a third locking arm 2022*a*2. The third arm 2022*a*1 extends from the auxiliary connecting plate 203 along a direction parallel to the first arm 2021*a*1. The third locking arm 2022*a*2 extends from a distal end of the third arm 2022*a*1 along a direction perpendicular to an extension of the third arm 2022*a*1.

The fourth arm portion 2022*b* includes a fourth arm 2022*b*1 and a fourth locking arm 2022*b*2. The fourth arm 2022*b*1 extends from the auxiliary connecting plate 203 in a direction parallel to the second arm 2021*b*1. The fourth locking arm 2022*b*2 extends from a distal end of the fourth arm 2022*b*1 along a direction perpendicular to an extension of the fourth arm 2022*b*1.

The locking structure 200 includes a resisting portion 204. The resisting portion 204 protrudes from the holding arm portion 202 toward the mating end portion 12.

In the illustrated embodiment, the resisting portion 204 includes a first resisting block 2041, a second resisting block 2042, a third resisting block 2043 and a fourth resisting block 2044.

The first resisting block 2041 protrudes outwardly from the first arm 2021*a*1. One end of the first resisting block 2041 is connected to the first locking arm 2021*a*2, and the other end of the first resisting block 2041 is connected to the body portion 201.

The second resisting block 2042 protrudes outwardly from the second arm 2021*b*1. One end of the second resisting block 2042 is connected to the second locking arm 2021*b*2, and the other end of the second resisting block 2042 is connected to the body portion 201.

The third resisting block 2043 protrudes outwardly from the third arm 2022*a*1. One end of the third resisting block 2043 is connected to the third locking arm 2022*a*2, and the other end of the third resisting block 2043 is connected to the auxiliary connecting plate 203.

The fourth resisting block 2044 protrudes outwardly from the fourth arm 2022*b*1. One end of the fourth resisting block 2044 is connected to the fourth locking arm 2022*b*2, and the other end of the fourth resisting block 2044 is connected to the auxiliary connecting plate 203.

The locking structure 200 further includes at least one third positioning protrusion 205 extending along the mating direction A1-A1. The locking structure 200 includes two third positioning protrusions 205. The two third positioning protrusions 205 are located on opposite sides of the auxiliary connecting plate 203.

Correspondingly, the outer wall of the mating end portion 12 defines at least one third positioning groove 128 and at least one fourth positioning groove 129 which are disposed side by side.

Referring to FIG. 14, the insulating body 1 includes two third positioning grooves 128. The two third positioning grooves 128 are located on opposite wall surfaces of the two adjacent mating end portions 12 (for example, corresponding top and bottom mating end portions 12). The third positioning groove 128 is recessed from the outer wall of the mating end portion 12 toward the mating end portion 12, and the third positioning groove 128 extends along the mating direction A1-A1.

The locking structure 200 includes two fourth positioning grooves 129. The two fourth positioning grooves 129 are located on opposite wall surfaces of the two adjacent mating end portions 12 (for example, corresponding top and bottom mating end portions 12). The fourth positioning groove 129 is recessed from the outer wall of the mating end portion 12 toward the mating end portion 12, and the fourth positioning groove 129 extends along the mating direction A1-A1.

When the third positioning protrusion 205 is located in the third positioning groove 128, the locking structure 200 is located at the pre-locking position. The first locking arm 2021*a*2, the second locking arm 2021*b*2, the third locking arm 2022*a*2 and the fourth locking arm 2022*b*2 are located in the first locking groove 126. The first resisting block 2041, the second resisting block 2042, the third resisting block 2043 and the fourth resisting block 2044 are located in the second locking groove 127. That is, when the locking structure 200 is located at the pre-locking position, the resisting portion 204 is located outside the first mating space 121 and does not affect the installation of the conductive terminal 2.

When the third positioning protrusion 205 is located in the fourth positioning groove 129, the locking structure 200 is located at the locking position. The first locking arm 2021*a*2, the second locking arm 2021*b*2, the third locking arm 2022*a*2 and the fourth locking arm 2022*b*2 are located in the first locking groove 126. The first resisting block 2041, the second resisting block 2042, the third resisting block 2043 and the fourth resisting block 2044 are located in the second locking groove 127 and partially protrude into corresponding first mating spaces 121. The resisting portion 204 prevents the conductive terminal 2 from moving along the mating direction A1-A1, and then locks the conductive terminal 2 to realize the function of preventing falling off.

In a certain direction, such as a top-bottom direction, perpendicular to the mating direction A1-A1, the first locking arm 2021*a*2 and the second locking arm 2021*b*2 are buckled on the outermost side walls of the two mating end portions 12, respectively, so that the positioning of the locking structure 200 relative to the insulating body 1 in the top-bottom direction is realized.

In a direction, such as a left-right direction, perpendicular to the mating direction A1-A1, the third positioning protrusion 205 cooperates with the third positioning groove 128 or cooperates with the fourth positioning groove 129 to achieve positioning. In addition, in order to improve the stability of cooperation and the smoothness of relative movement between the mating end portion 12 and the locking structure 200, the mating end portion 12 further includes three arc-shaped protrusions 1210. Referring to FIG. 6, the arc-shaped protrusions 1210 extend along the mating direction A1-A1. Along the direction of relative movement between the locking structure 200 and the mating end portion 12, the three arc-shaped protrusions 1210 are located outside the third positioning groove 128; located between the third positioning groove 128 and the third positioning groove 128; and located outside the fourth positioning groove 129.

Along the mating direction A1-A1, referring to FIG. 13, the width of the locking arms (the first locking arm 2021*a*2, the second locking arm 2021*b*2, the third locking arm 2022*a*2 and the fourth locking arm 2022*b*2) is similar to or the same as the width of the first locking groove 126, so that the positioning of the locking structure 200 and the insulating body 1 in the mating direction A1-A1 is realized.

In one embodiment of the present disclosure, along the mating direction A1-A1, the positioning between the locking structure 200 and the insulating body 1 can also be achieved through other components (for example, the adaptation of the width of the resisting portion 204 and the width of the second locking groove 127).

In the foregoing embodiments, the holding arm portion 202 is U-shaped. In other embodiments of the present disclosure, the holding arm portion 202 may also be arc-shaped, as long as it can be adapted to the mating end portion 12 of the connector 100.

In the foregoing embodiments, the connector 100 includes four mating end portions 12 which are arranged in a 2×2 array pattern. Referring to FIG. 1, FIG. 5, FIG. 6 and FIG. 14, in the illustrated embodiment of the present disclosure, the connector 100 defines an accommodating space 13 formed by the four mating end portions 12. The body portion 201 is received in the accommodating space 13. Correspondingly, the locking structure 200 has two holding arm portions 202, namely the first holding arm portion 2021 and the second holding arm portion 2022. The first holding arm portion 2021 is hugged on the two mating end portions 12 facing up and down. The second holding arm portion 2022 is hugged on the other two opposite mating end portions 12 facing up and down.

In other embodiments of the present disclosure, the connector 100 may include fewer (for example, two or even one) or more (for example, six or even more) mating end portions 12. Correspondingly, it is only necessary to hold the holding arm portion 202 on the outer wall of the mating end portion 12 accordingly. In some embodiments, the third positioning protrusion 205 can be provided at other positions, such as an outer wall of the insulating body 1.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A connector assembly, comprising:

a connector comprising an insulating body, the insulating body comprising at least one mating end portion, the at least one mating end portion defining a first mating space for receiving a conductive terminal; and a locking structure fixed to the at least one mating end portion, the locking structure comprising a pre-locking position and a locking position which are relative to the at least one mating end portion; the locking structure comprising a body portion and a resisting portion; the body portion being configured to receive a high voltage interlock terminal;

wherein the resisting portion is configured such that: when the locking structure is located at the pre-locking position, the resisting portion is located outside the first mating space; when the locking structure is in the locking position, at least part of the resisting portion protrudes into the first mating space.

2. The connector assembly according to claim 1, wherein the at least one mating end portion comprises a first mating end surface through which the first mating space extends; the body portion comprises:

a second mating end surface; and a receiving and positioning portion comprising a receiving cavity and a receiving wall surrounding the receiving cavity; the receiving cavity extending through the second mating end surface along an extending direction of the receiving cavity;

wherein a peripheral side of the high voltage interlock terminal abuts against the receiving wall.

3. The connector assembly according to claim 2, wherein the body portion further comprises:

an end wall protruding toward the receiving cavity from an end of the receiving wall which is located adjacent to the second mating end surface; and a second positioning protrusion protruding from the receiving wall toward the receiving cavity;

wherein along the extending direction of the receiving cavity, the end wall is separated from the second positioning protrusion by a certain distance; the high voltage interlock terminal has at least one surface abutting against the end wall; and the high voltage interlock terminal has at least one surface abutting against the second positioning protrusion.

4. The connector assembly according to claim 3, wherein the end wall comprises a guide inclined surface; the guide inclined surface protrudes inwardly from the second mating end surface into the receiving cavity and extends in a direction away from the second mating end surface.

5. The connector assembly according to claim 1, wherein the locking structure further comprises a first holding arm portion comprising a first arm portion and a second arm portion connected to the body portion;

the at least one mating end portion comprises only one mating end portion, and wherein the first arm portion and the second arm portion are configured to be buckled on opposite side walls of the only one mating end portion; or, the at least one mating end portion comprises a plurality of mating end portions, and the first arm portion and the second arm portion are configured to be buckled on outermost opposite side walls of the plurality of mating end portions.

6. The connector assembly according to claim 5, wherein the first arm portion comprises a first arm and a first locking arm; the first locking arm extends from a distal end of the first arm along a direction perpendicular to an extension of the first arm;

the second arm portion comprises a second arm and a second locking arm; the second locking arm extends from a distal end of the second arm along a direction perpendicular to an extension of the second arm;

the first arm and the second arm extend from opposite sides of the body portion in opposite directions.

7. The connector assembly according to claim 5, wherein the locking structure further comprises a second holding arm portion; the second holding arm portion is parallel to the first holding arm portion; and a structure of the second holding arm portion is the same as that of the first holding arm portion.

8. The connector assembly according to claim 7, wherein the locking structure further comprises a third positioning protrusion extending along a mating direction of the connector;

an outer wall surface of the at least one mating end portion defines a third positioning groove and a fourth positioning groove which are juxtaposed to each other;

when the third positioning protrusion is located in the third positioning groove, the locking structure is in the pre-locking position;

when the third positioning protrusion is located in the fourth positioning groove, the locking structure is in the locking position.

9. The connector assembly according to claim 5, wherein the resisting portion protrudes from the first holding arm portion toward the at least one mating end portion.

10. The connector assembly according to claim 8, wherein the at least one mating end portion comprises a first locking groove and a second locking groove;

the first locking groove is recessed from the outer wall of the at least one mating end portion toward an interior of the at least one mating end portion;

the second locking groove is recessed from a groove bottom of the first locking groove toward the first mating space and communicates with the first mating space;

when the locking structure is located at the pre-locking position, part of the first holding arm portion is located in the first locking groove; and at least part of the resisting portion is located in the second locking groove;

when the locking structure is located at the locking position, part of the first holding arm portion is located in the first locking groove; and at least part of the resisting portion protrudes into the first mating space through the second locking groove.

11. A connector assembly, comprising:

a connector comprising an insulating body and a plurality of conductive terminals, the insulating body comprising an insulating body portion, a plurality of mating end portions extending from the insulating body portion, and an accommodating space formed by the plurality of mating end portions; each mating end portion defining a first mating space for receiving a corresponding conductive terminal; and a locking structure comprising a body portion, a plurality of holding arm portions and a resisting portion; the body portion being received in the accommodating space and configured to receive a high voltage interlock terminal; each holding arm portion being configured to be fixed to a corresponding mating end portion; the locking structure comprising a pre-locking position and a locking position which are relative to the connector;

wherein the resisting portion is configured such that: when the locking structure is located at the pre-locking position, the resisting portion is located outside a corresponding first mating space; when the locking structure is in the locking position, at least part of the resisting portion protrudes into the corresponding first mating space.

12. The connector assembly according to claim 11, wherein each mating end portion comprises a first mating end surface through which the first mating space extends; the body portion comprises:

a second mating end surface; and a receiving and positioning portion comprising a receiving cavity and a receiving wall surrounding the receiving cavity; the receiving cavity extending through the second mating end surface along an extending direction of the receiving cavity;

wherein a peripheral side of the high voltage interlock terminal abuts against the receiving wall.

13. The connector assembly according to claim 12, wherein the body portion further comprises:

an end wall protruding toward the receiving cavity from an end of the receiving wall which is located adjacent to the second mating end surface; and a second positioning protrusion protruding from the receiving wall toward the receiving cavity;

wherein along the extending direction of the receiving cavity, the end wall is separated from the second positioning protrusion by a certain distance; the high voltage interlock terminal has at least one surface abutting against the end wall; and the high voltage interlock terminal has at least one surface abutting against the second positioning protrusion.

14. The connector assembly according to claim 13, wherein the end wall comprises a guide inclined surface; the guide inclined surface protrudes inwardly from the second mating end surface into the receiving cavity and extends in a direction away from the second mating end surface.

15. The connector assembly according to claim 11, wherein the plurality of holding arm portions comprise a first holding arm portion comprising a first arm portion and a second arm portion connected to the body portion;

wherein the first arm portion and the second arm portion are configured to be buckled on opposite side walls of one mating end portion; or, the first arm portion and the second arm portion are configured to be buckled on outermost opposite side walls of at least two mating end portions.

16. The connector assembly according to claim 15, wherein the first arm portion comprises a first arm and a first locking arm; the first locking arm extends from a distal end of the first arm along a direction perpendicular to an extension of the first arm;

the second arm portion comprises a second arm and a second locking arm; the second locking arm extends from a distal end of the second arm along a direction perpendicular to an extension of the second arm;

the first arm and the second arm extend from opposite sides of the body portion in opposite directions.

17. The connector assembly according to claim 15, wherein the plurality of holding arm portions comprise a second holding arm portion; the second holding arm portion is parallel to the first holding arm portion; and a structure of the second holding arm portion is the same as that of the first holding arm portion.

18. The connector assembly according to claim 17, wherein the locking structure further comprises a third positioning protrusion extending along a mating direction of the connector;

an outer wall surface of each mating end portion defines a third positioning groove and a fourth positioning groove which are juxtaposed to each other;

when the third positioning protrusion is located in the third positioning groove, the locking structure is in the pre-locking position;

when the third positioning protrusion is located in the fourth positioning groove, the locking structure is in the locking position.

19. The connector assembly according to claim 15, wherein the resisting portion protrudes from the first holding arm portion toward the corresponding mating end portion.

20. The connector assembly according to claim 18, wherein each mating end portion comprises a first locking groove and a second locking groove;

the first locking groove is recessed from the outer wall of the mating end portion toward an interior of the mating end portion;

the second locking groove is recessed from a groove bottom of the first locking groove toward the first mating space and communicates with the first mating space;

when the locking structure is located at the pre-locking position, part of the first holding arm portion is located in the first locking groove; and at least part of the resisting portion is located in the second locking groove;

when the locking structure is located at the locking position, part of the first holding arm portion is located in the first locking groove; and at least part of the resisting portion protrudes into the first mating space through the second locking groove.

* * * * *